United States Patent [19]

Krofchalk et al.

[11] 4,027,889

[45] June 7, 1977

[54] STAIR-CLIMBING CARRIER

[75] Inventors: Gary F. Krofchalk, Rochester; Andrew D. Dodds, Claremount, both of Minn.

[73] Assignee: Kando Incorporated, Claremont, Minn.

[22] Filed: Nov. 10, 1975

[21] Appl. No.: 630,093

[52] U.S. Cl. .............................. 280/5.22; 180/9.22
[51] Int. Cl.² ........................................... B60P 9/00
[58] Field of Search ................. 280/5.22, 5.24, 5.3, 280/5.28, 5.32, 28.5; 305/1, 2; 180/9.22; 187/11; 214/1, 2

[56] References Cited
UNITED STATES PATENTS

| 2,928,501 | 3/1960 | Ramirez | 187/11 |
| 3,713,501 | 1/1973 | Hurt | 280/5.22 |

FOREIGN PATENTS OR APPLICATIONS

| 1,046,444 | 10/1966 | United Kingdom | 280/5.22 |

OTHER PUBLICATIONS

S.I.M. Equipment Limited "Alouette" Mar. 30, 1964.

*Primary Examiner*—Philip Goodman
*Attorney, Agent, or Firm*—H. Dale Palmatier

[57] ABSTRACT

A tracked, stair-climbing carrier for carrying loads up and down stairs and across floors. The carrier includes a frame mounting a pair of parallel endless tracks at its sides for moving the frame forwardly and rearwardly along a floor and up and down stairs. An upper, load-receiving deck is slideably carried by the frame and is movable forwardly and rearwardly to adjust the center of gravity of the carrier and load and permits the rearward end of the deck to rest upon the floor when the frame has been tilted to an acute angle with the floor. A load-bearing lifting arm, receivable in the frame between the tracks, may be swung downwardly to cause the forward end of the frame to tilt upwardly at an acute, stair-engaging angle to the floor, the tilted frame with the deck and load being supported rearwardly by the tracks or supplemental wheels and forwardly by casters at the forward, downwardly swung end of the lifting arm, whereupon the tilted, fully supported and balanced load may be moved along the floor with the tracks in position to engage stairs, ramps, curbs, etc.

15 Claims, 13 Drawing Figures

STAIR-CLIMBING CARRIER

BACKGROUND OF THE INVENTION

Large, heavy objects such as file cabinets and refrigerators must often be moved from one floor to another within a warehouse of office building or the like. Although such objects can easily be moved along a level floor by use of a "dolly" or handtruck, difficulty is experienced in moving objects of this type from one floor to another in the absence of elevators. Such bulky and weighty objects are ordinarily "manhandled" up and down stairs; that is, the objects are physically lifted by a team of workmen and carried up and down stairs. Labor costs are thus high, and the chances of injury are large.

Efforts have been made in the past to provide mechanical carriers for carrying large objects up and down stairs; representative of these carriers are those of U.S. Pat. Nos. 2,928,501 and 3,512,658. These devices are not easily loaded and unloaded, however, and either require the use of a separate "dolly" in conjunction with stair climbing or require a human operator to bear a portion of the weight of the load as the load is moved.

BRIEF DESCRIPTION OF THE INVENTION

The present invention provides a tracked carrier which moves along a floor in a tilted position supported rerwardly by the tracks or supplemental wheels and forwardly by a lifting arm. It its tilted position, the carrier of the invention is adapted to encounter and ascend stairs. No weight-bearing human effort is required to load and unload the carrier, nor does the carrier normally require the use of an additional dolly or handtruck for operation.

The tracked carrier of the invention includes a frame carrying a spaced pair of parallel endless tracks at its sides movable in an elongated path to drive the frame forwardly and rearwardly along a surface. A lifting arm is pivotally mounted at one of its ends to the frame between the tracks and adjacent the rearward end of the frame, and is movable between a retracted position and a load-bearing position. At its other end, the lifting arm has one or more floor-engageably casters which are nearer the forward than the rearward ends of the tracks when the arm is in its retracted position. Means are provided for controllably pivoting the lifting arm outwardly and downwardly from the frame about its pivot point into a load-bearing position to raise the forward end of the frame and to thus tilt the frame to form an acute, stair-engaging angle with respect to the floor with the center of gravity of the carrier spaced rearwardly of the casters. In its load-bearing position, the lifting arm coacts with the tracks to carry the load at the acute angle with respect to the floor, in which position the load may be moved along the floor. Slideably mounted to the frame for forward and rearward movement is a load-receiving deck, and the carrier includes load adjustment means for moving the deck forwardly or rearwardly of the frame to adjust the center of gravity of the carrier and its load over the tracks. The load adjustment means permits the rearmost end of the deck to extend rearwardly of the rearward end of the tracks to rest on the floor when the frame is tilted to form said acute angle with the floor to facilitate loading and unloading.

The means for pivoting the lifting arm includes at least one and desirably a pair of powered, axially extensible thrusters lying in a common plane and each joined at one end to the frame. At their other ends, the thrusters are mounted to a cam carried by the lifting arm and engageable with a frame-mounted cam follower to initiate outward swinging of the lifting arm. A T-shaped bracket mounts the thrusters pivotally to the frame and pivots about an axis normal to the plane of the thrusters to allow for non-uniform extension of the thrusters as the lifting arm swings downwardly and outwardly.

The load, such as a filing cabinet, may be attached to the deck when the latter is in an upright position. The carrier is then tipped into its tilted position, the deck sliding rearwardly to maintain contact between its lower, rearward end and the floor. The deck is then slid forwardly and upwardly on the frame to position the center of gravity of the load between the rearward end of the tracks and the lifting arm casters. The well balanced and supported tilted load may be moved along a floor with the carrier in position at an angle to the floor to engage the treads of a stairway.

BRIEF DESCRIPTION OF THE DRAWING

FIGS. 1-5 are elevational views of the carrier of the invention with load attached, showing the carrier and load in different positions as the load is loaded and transported across a floor and up a flight of stairs;

FIG. 8 is a cross-sectional view taken along line 8—8 of FIG. 6;

DESCRIPTION OF THE PREFERRED EMBODIMENT

Figures 2, 3:
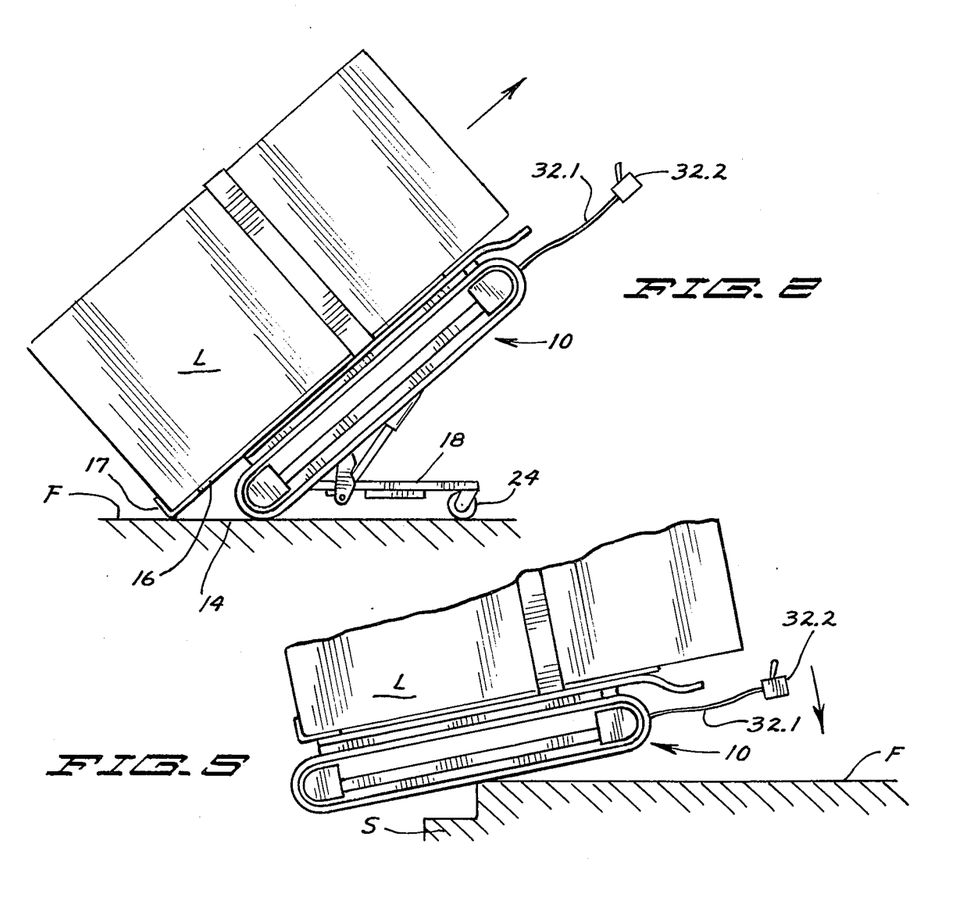
Figures 6, 10:
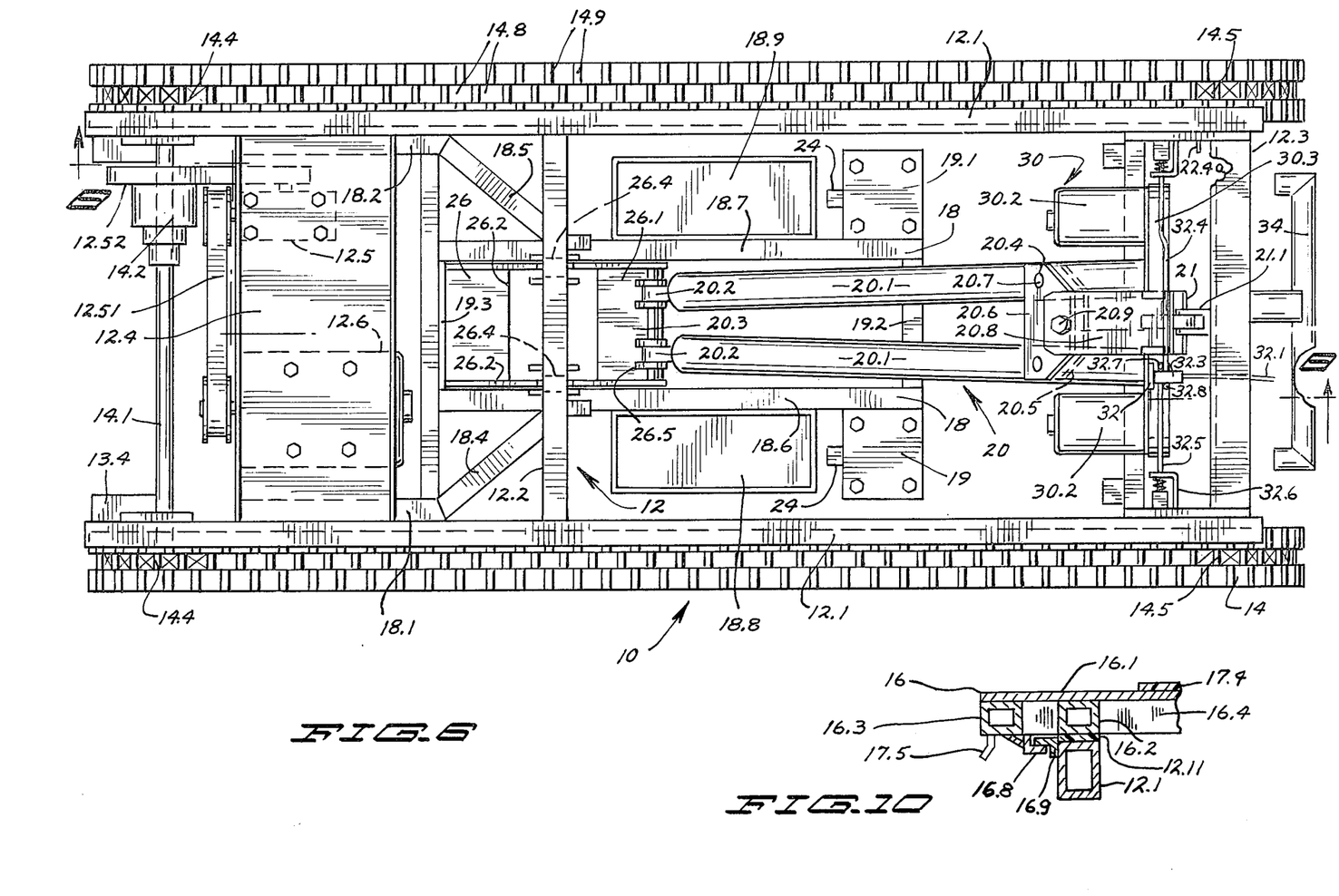
FIG. 6 is an oblique view taken along line 6—6 of FIG. 3.
FIG. 10 is a partial, broken away, cross-sectional view taken along line 10—10 of FIG. 9.
Figures 7, 9:
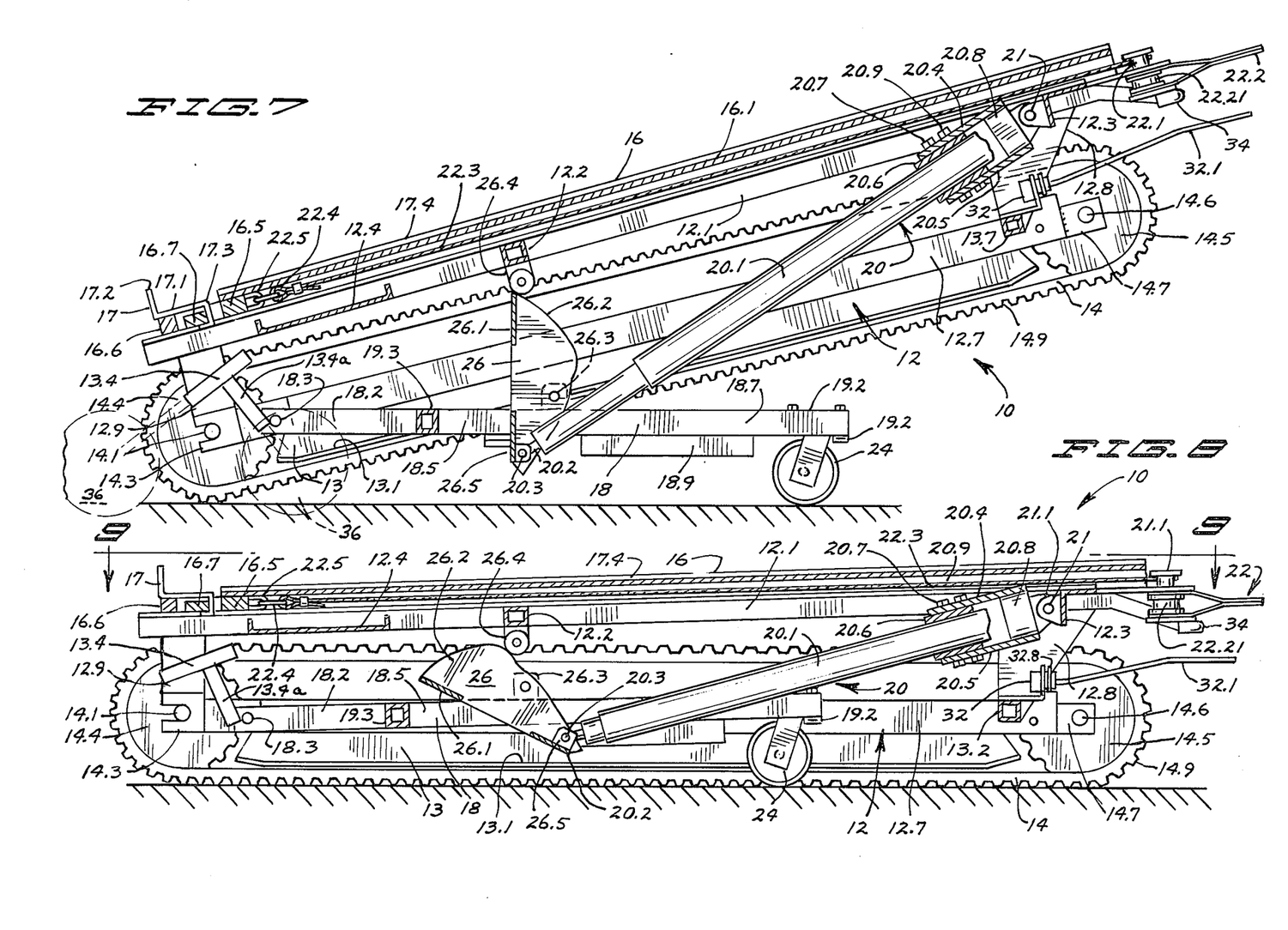
FIG. 7 is a side view of the carrier in cross section with the frame tilted.
FIG. 9 is a top view taken along 9—9 of FIG. 8, and showing a modification in the winch and cable.
Figure 9:
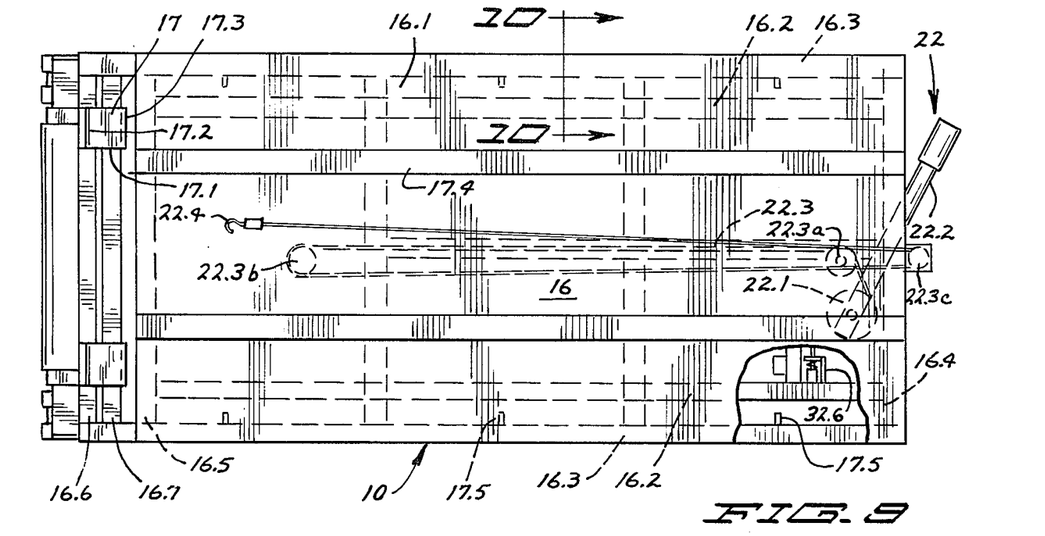

Referring first to FIGS. 6-10, the carrier 10 of the invention includes a generally flat, elongated frame designated generally as 12, and endless tracks 14 carried on either side of the frame and movable in an elongated path to drive the frame forwardly and rearwardly along a surface. At its top, the frame carries a forwardly and rearwardly slideable deck 16 for carrying loads. A lifting arm 18 is pivotally mounted at its rearward end to the rearward end of the frame and is received within the frame between the tracks in its retracted position, as shown in FIG. 8. Means (designated generally 20) are provided for controllably pivoting the lifting arm 18 downwardly and outwardly from the frame as shown in FIG. 7 to tilt the front of the frame upwardly into a stairway-engaging position. Balance adjustment means, designated generally as 22, is provided to move the deck 16 forwardly and rearwardly along the track as desired, and permits the deck to engage the floor even when the frame is in its tilted position, as shown in FIG. 2. The forward end of the lifting arm 18 is provided with casters 24 which extend forwardly of the center of gravity of the carrier when the lifting arm is retracted as shown in FIG. 8 and also when the lifting arm is in its extended position as shown, for example, in FIG. 2.

The Frame 12 is of generally parallelepiped shaped and includes forwardly and rearwardly extending deck support bars or guides 12.1 which are rigidly connected by transverse support bars 12.2, 12.3, shown best in FIG. 6. A mounting platform 12.4 for mounting a gear reduction unit 12.5 and motor 12.6 extends between the rail 12.1 adjacent the rear of the frame, as shown best in FIG. 6. The motor and gear reduction units have been omitted in FIGS. 7 and 8 for purposes of clarity.

Forwardly and rearwardly extending braces 12.7 are carried beneath the respective deck guides 12.1 by forward and rearward brackets 12.8, 12.9 at the sides of the frame. Affixed to the bottom of the braces 12.7 are track guide bars 13 having nylon wear strips 13.1 affixed to their bottom surfaces. A tie rod 13.2 is connected between the bottom ends of the front brackets 12.8, 12.9 as shown in FIGS. 7 and 8.

A rear axle 14.1 is provided with differential gearing 14.2 and is carried by bearing blocks 14.3 mounted to the frame at the rear of the braces 12.7. Carried by the axle 14.1 at either end are toothed sprockets 14.4. Another pair of toothed sprockets 14.5, freewheeling, are mounted on axles 14.6 which in turn are carried on bearing blocks 14.7 mounted to the forward ends of the braces 12.7

Extending about the toothed sprockets 14.4, 14.5 at either side of the frame are endless tracks 14. As shown in FIG. 6, each track may be provided with spaced holes 14.8 centrally along its length to receive the teeth of the toothed sprockets 14.4, 14.5, and may be reinforced by including therewithin a drive chain to receive the sprocket teeth between the rollers thereof. Desirably, the outer surfaces of the tracks are unbroken, and the inner surfaces of the tracks may be provided with suitable depressions between the chain rollers to engage the teeth of the toothed sprockets. The outer surfaces of the tracks are provided with outwardly extending lugs 14.9 to enable the tracks to engage stair steps without slipping. The tracks, as thus described, are driven through elongated paths by rear sprockets 14.4 driven through the axle 14.1 through differential 14.2, gear reduction unit 12.5 and motor 12.6. In its rearward run from the forward sprockets 14.5 to the rear sprockets 14.4, the tracks are slideably supported against the nylon strips 13.1.

The deck 16 is formed of a rectangular metal plate 16.1 of sufficient dimensions to substantially cover the entire top of the frame 12. The plate is supported from beneath by a framework including a pair of longitudinally extending inner and outer deck braces 16.2, 16.3 on either side of the metal plate, a transverse brace 16.4 at the front edge of the deck, and a transverse rear brace 16.5 at the rear edge of the deck, as well as other transverse braces. Longitudinal braces 16.3 extend rearwardly for a short distance beyond the deck plate 16.1, and are joined transversely at their rearward ends by a pair of parallel, spaced bars 16.6, 16.7, as shown best in FIGS. 7-9. The upper surface of the bar 16.6 is spaced below the upper surface of the deck plate 16.1 so as to accommodate the thickness of a toeplate 17. As shown best in FIGS. 7 and 9, the toeplate includes a flat, central portion 17.1 which rests upon the upper surface of the bar 16.6 and which has an upwardly turned lip 17.2 at its rearward end. At its forward end, the toeplate has a downwardly and rearwardly turned hook 17.3 which hooks downwardly over the leading edge of the bar 16.7 into the space between bars 16.7 and 16.6. The upper surface of the bar 16.7 is depressed slightly to allow some play between it and the toeplate 17, as shown in FIG. 7, so that the toeplate can be removed easily from the deck.

To the upper surface of the deck 16 are affixed one or more wear strips 17.4 of rubber of the like to engage the load to be placed on the deck. Downwardly and inwardly protruding guide followers, shown as right angled strips 16.8 in FIG. 10, are mounted to the deck framework and coact with similar, inverted angled strips 16.9 on the longitudinal frame bars 12.1 to guide the deck forwardly and rearwardly with the deck brace 16.2 riding upon a slip plate 12.11 of nylon or the like attached to the frame bar 12.1 (FIG. 10). If desired, the deck plate itself may be omitted, and loads may be carried on the deck frame.

A winch is mounted to the forward end of the carrier frame 12 and includes a winch drum 22.1, a generally forwardly extending crank handle 22.2, and a common, releasable ratchet and pawl mechanism 22.21 for rotating the drum by cranking the handle 22.2. As shown in FIGS. 7 and 8, a cable 22.3 is wound at one end around the drum and extends rearwardly along the bottom surface of the deck approximately midway between the deck sides. The cable terminates rearwardly in a hook 22.4 which engages, in turn, an eyebolt 22.5 which is attached to the leading surface of the deck brace 16.5. Operation of the winch hence causes the deck 16 to move forwardly or rearwardly along the frame 12 of the carrier and permits the rearward end of the deck to extend rearwardly of the rearward end of the tracks, the significance of which will be subsequently explained.

Figure 13:
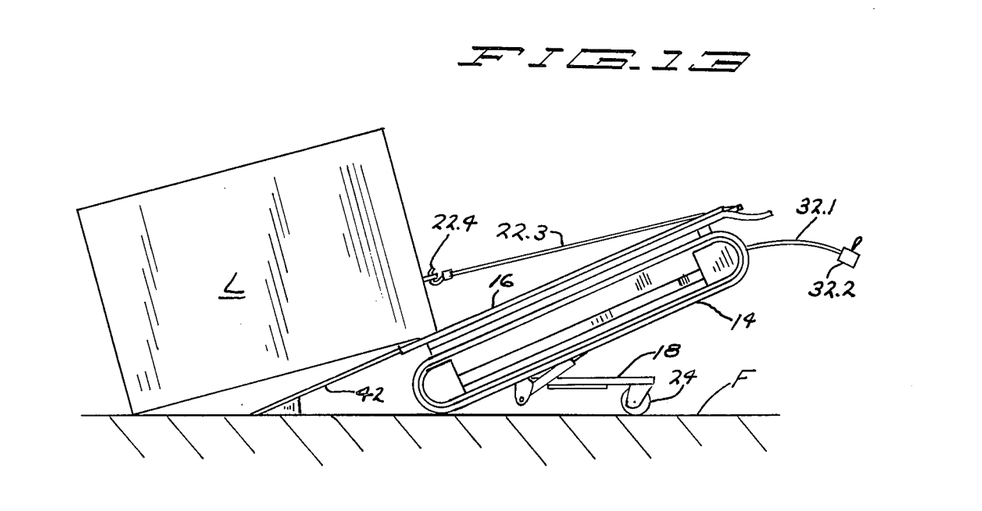
FIG. 13 is a side view of the carrier of the invention of FIG. 9 as the carrier is loaded.

In the cable modification shown in FIG. 9, the cable 22.3 leads from the winch drum about a central, frame-mounted pulley 22.3a and extends rearwardly beneath the deck to pass about a deck-mounted pulley 22.3b. The cable then returns forwardly beneath the deck, is trained about pulley 22.3c mounted at the leading edge of the deck frame, and then extends rearwardly above the deck and terminates in hook 22.4 which may be attached to the deck or to a load to be pulled onto the deck, as shown in FIG. 13. A manually operated deck latch 22.4a serves to lock the deck to the carrier frame when a load is to be pulled onto the deck.

A lifting arm 18, shown best in FIGS. 6-8, includes a pair of lever arms 18.1, 18.2 spaced apart and joined pivotally at their rearward ends, at pivots 18.3, to the respective rearward ends of the frame braces 12.7. The lever arms extend forwardly and are fully receivable within the frame between the tracks of the carrier. Intermediate their length, the lever arms have convergent sections 18.4, 18.5, which lead into parallel, spaced, forwardly extending sections 18.6, 18.7, respectively. Horizontal battery mounting plates 18.8, 18.9 are attached in outrigger-fashion to the sides from the last-identified lever arm sections. The sections 18.6, 18.7 terminate forwardly in caster mounting plates 19, 19.1, respectively, and caster (full circle swivel wheels) 24 are mounted to the bottom of the plates 19, 19.1. The lever arms are connected to one another by forward transverse strut 19.2 at their forward ends and a rearward transverse strut 19.3 at the rearward ends of the convergent portions 18.4, 18.5. The dimensions of the lifting arm are so chosen that when the lifting arm is fully received within the frame (as in FIG. 8), the casters 24 are lifted completely above the level of the tracks 14 so as not to interfere with the tracks.

As shown best in FIGS. 6-8, a cam 26 is pivotally mounted to the lever arms 18.1, 18.2 for swinging movement between the arms. The cam includes a baseplate 26.1 having outwardly turned, curved cam edges 26.2 at its sides. The cam edges 26.2 are pivotally mounted, as with bolts, to ears 26.3 mounted to the upper surface of the lever arms at points intermediate their length so that as the cam is pivoted, the cam edge mvoes through the positions shown in FIGS. 7 and 8. To the transverse bar 12.2 of the frame 12 are affixed downwardly projecting rollers 26.4 which serve as cam followers, and which are positioned to contact and roll against the curved cam edges 26.2 as the cam is pivoted, as shown in FIGS. 7 and 8. Movement of the cam 26 (FIG. 8) is a clockwise direction hence forces the rollers 26.4 upwardly and raises the frame with respect to the lifting arm 18 (FIG. 7).

Means 20 for forcefully pivoting the cam 26 about its pivotal connections to the lifting arm includes a pair of thrusters shown generally as 20.1 which extend between the frame and the cam. The thrusters 20.1 are generally parallel or very slightly divergent forwardly, as shown in FIG. 6, and each of the thrusters is pivotally joined at its rearward end 20.2 to a transverse pivot bar 20.3 carried between the cam edges 26.2 at the forward and downward end of the cam and further supported by ears 26.5 mounted to the cam baseplate 26.1. From the thus-described pivotal attachment, the thrusters 20.1 extend forwardly and upwardly for mutual pivotal connection between the upper and lower plates 20.4, 20.5 of a bracket 20.6. Pivot pins 20.7 passing through the plates and the thrusters. As shown in FIG. 6, the thrusters are spaced from one another at their points of attachment to the cam 26 and to the bracket 20.6.

The bracket 20.6, in turn, is pivotally connected to a generally U-shaped bracket holder 20.8. The arms of the bracket holder extend rearwardly and downwardly above and below the respective plates of the bracket 20.6 and are pivotally connected to the plates by means of a bolt 20.9. The forward crossbar of the U-shaped bracket holder 20.8 is pivotally connected to the frame 12 of the carrier through a transverse pivot pin 21 which passes through ears 21.1 extending rearwardly of the frame support bar 12.3. The pivot pin 21 thus permits the bracket holder 20.8, and the bracket 20.6, to move upwardly and downwardly between the position shown, for example, in FIGS. 7 and 8. The pivot pins 20.7 and 20.9, moreover, permit the bracket 20.6 to pivot to the right or left with respect to the bracket holder 20.8, and in this manner some unevenness in the rate of extension or retraction of the thrusters 20.1 is permitted.

Each of the trusters, or actuators, 20.1, are provided internally with mating, male and female threaded tubes whereby rotation of one of the tubes causes the other tube to move along the axis of the thruster and to pivot the cam 26 about its pivotal connection to the lifting arm 18. Each thruster is provided with its separate power supply 30 including an electric motor 30.2 and drive belt 30.3, these power units being mounted to, and carried by, the forward ends of the thrusters which extend forwardly through the bracket 20.6. The motors 30.2 and 12.6 (the latter driving the track 14) may be reversible, direct current motors which draw power from batteries (not shown) supported on battery mounting plates 18.8, 18.9. The motors 30.2 are operated in unison to cause simultaneous extension or retraction of the thrusters 20.1. The pivotally mounted bracket 20.6, which allows for differences in the extension or retraction rates of the thrusters, lends flexibility to the system and effectively prevents any binding of the thrusters, cam and cam follower rollers.

The electrical system for the carrier of the invention, which for reasons of clarity is not shown in the drawing, includes electric leads running to each of the electric motors 30.2, 12.6 and to the batteries, and leading to connector box 32 which is mounted to a forward portion of the frame. A multi-wire lead 32.1 extends forwardly from the box 32 and terminates in switch box 32.2 (see, e.g., FIG. 4) which has switches for energizing the motors 30.2, 12.6 and for reversing the rotation of the motors. A generally cylindrical electric plug 32.2 is pluggable rearwardly into the connector box, and from the plug extends a multi-wire lead 32.1 terminating forwardly in a switch box 32.2 (see e.g., FIG. 4) which has switches for energizing, and reversing the rotation of, the motors 30.2, 12.6. Transverse locking pins 32.4, 32.5 are slidably mounted to the carrier frame by spring-loaded brackets 32.6 which spring-urge the locking pins respectively outwardly into contact with the sprockets 14.5 to prevent the latter from turning. The locking pins ech extend inwardly beneath the plug 32.3 and have upwardly turned ends 32.7, 32.8 which bear against the plug, as shown best in FIG. 6, the plug hence preventing the pins from sliding outwardly to contact the sprockets 14.5. Should the plug be pulled from the connector box (as, for example, when the carrier tips rearwardly), the locking pins are freed to snap outwardly and lock the track against further movement. Downward force applied to the arm 18, of course, will permit the carrier and load to assume the position shown in FIG. 2.

Figures 1, 3, 4:
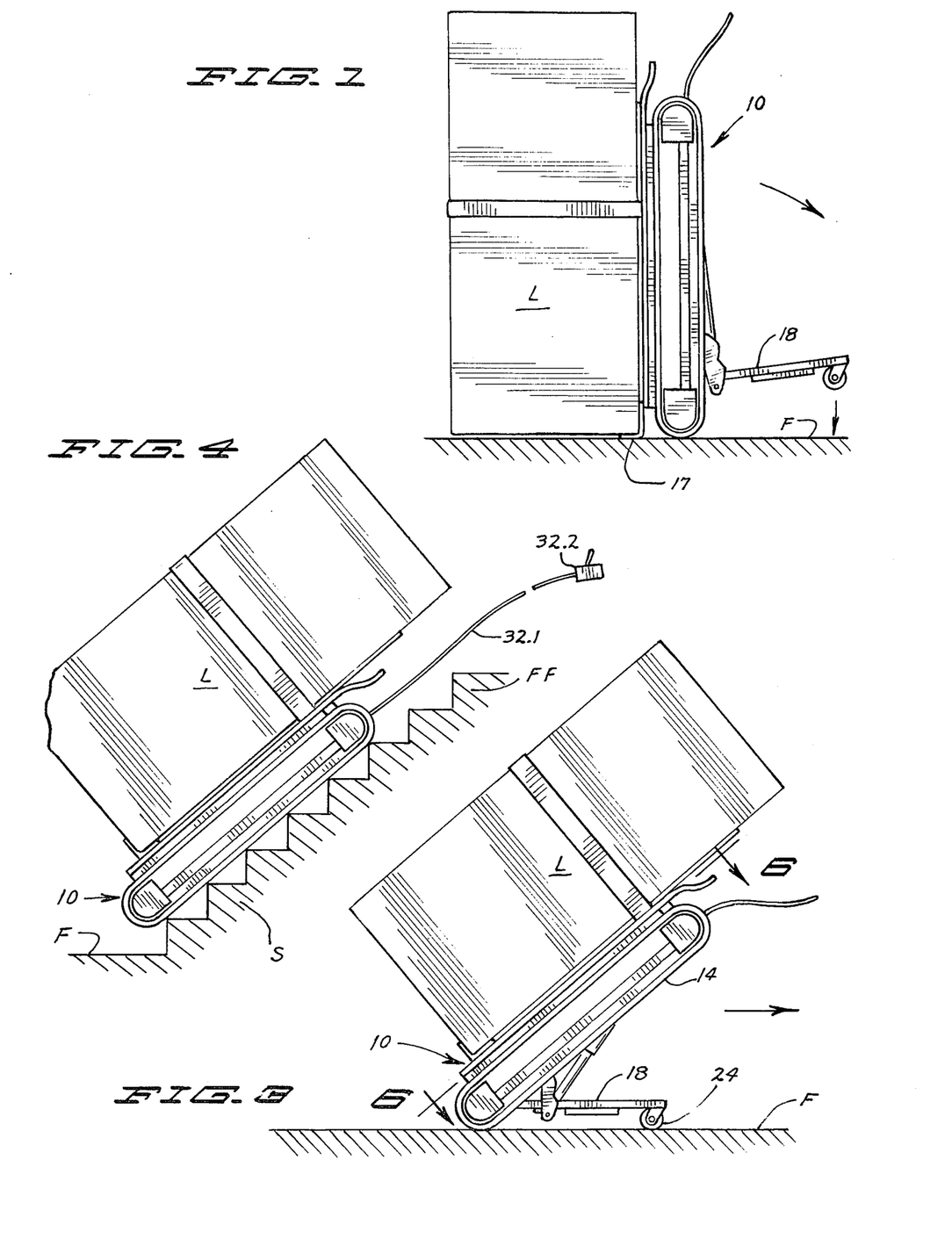

A T-shaped handle 34 protrudes forwardly of the frame and is rigidly attached to the frame support bar 12.3, the handle being utilized for pulling the load in the position shown in FIG. 3 across the floor and for otherwise manipulating the carrier.

The frame of the carrier, and the deck framing, is preferably made of lengths of metal tubing having a generally rectangular cross section, the sections of tubing being desirably welded together for strength. This type of construction permits ready assembly of the carrier. For example, the bearing blocks 14.7 which bear the front sprockets 14.5 may have rearwardly extending tubular members which are received within, and then bolted to, the tubular longitudinal frames 12.7. An extra pair of wheels, shown as 36 in phantom lines in FIG. 7 and termed "bogie" wheels, may be mounted on bearing blocks similar to the bearing blocks 14.7 and having short, forwardly protruding tubular mounting rods which are receivable within the short tubing sections 13.4 mounted to the rear of the frame. Generally forwardly and downwardly protruding tubing sections 13.4a are provided to permit the bogie wheels 36 to be mounted slightly forwardly of the rear end of the track. The bogie wheels may be employed when loads are to be moved over a substantial horizontal distance, and operate to lift the rearward end of the track from the surface so that the load is supported entirely by the bogie wheels and the casters 24. Power from the track motor 12.6 may be conveyed to the gear box 12.5 by means of a drive belt 12.51, and from the gear box to the differential gear 14.2 by means of a drive chain 12.52, as shown in FIG. 6.

Figure 11:
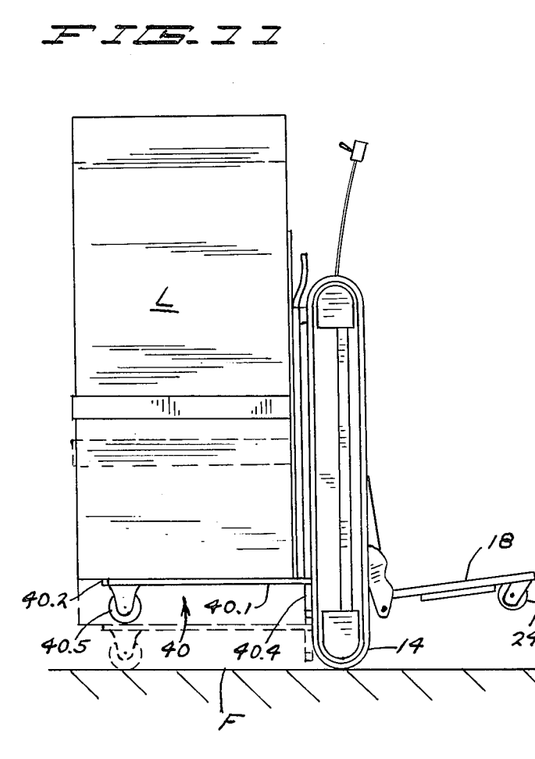
FIG. 11 is a side view of a modified form of the invention.
Figure 12:
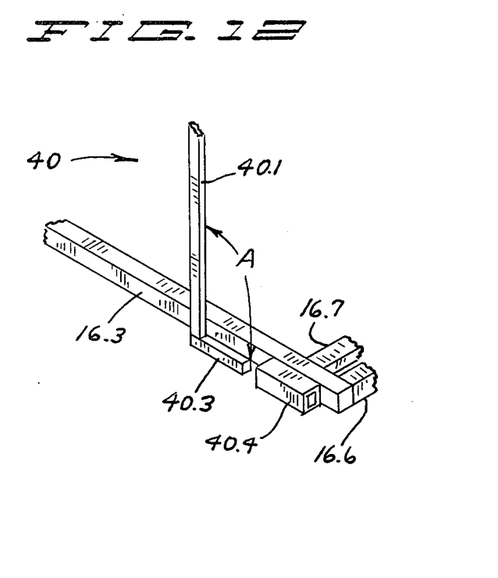
FIG. 12 is a perspective, broken away view of a portion of the device shown in FIG. 11.

FIGS. 11 and 12 show a rear, wheeled platform 40 removably attached to the carrier deck frame for transporting large objects such as file cabinets in an upright position along a generally level surface. The platform includes a generally U-shaped frame having legs 40.1 and cross bar 40.2. The free ends 40.3 of the legs are bent so as to make angles with the legs of slightly greater than 90°. As shown in FIG. 12, the angle A may be, for example, about 95°. The ends 40.3 of the legs, which may be rectangular in cross section, are received in tubular receptacles 40.4 parallel to and rigidly fastened as by welding to the respective outer longitudinal deck braces 16.3 near the rearward ends of the braces. The ends 40.3 of the platform legs fit loosely in the receptacles 40.4 so that when rearward pressure is exerted on the platform (as in FIG. 11), the legs ends bend in the receptacles with the legs making approximately a right angle with the deck. Additional braces (not shown) may extend between the legs and the cross bar 40.2 to rigidify the platform as shown in FIG. 11 so that the load L is supported on the platform forwardly by the carrier tracks and rearwardly by the casters, in which position the load may be transported up or down gradual inclines or across a level surface by the tracks. Because of the forward and rearward movement afforded the deck, the deck and platform 40 coact to provide a lift or elevator for raising and lowering the load, as indicated by the solid line and phantom line positions in FIG. 11.

As described elsewhere, the toeplates 17 may be easily removed so that a load L may be winched onto the deck, as shown in FIG. 13. To load the carrier in this manner, the carrier is first positioned at a small angle to the horizontal, as shown in FIG. 13, and deck latch 22.4a (FIG. 6) is thrown to lock the deck to the carrier frame, Auxiliary ramps 42 are placed in position between the floor and the rear of the deck, the cable hook 22.4 is attached to the load L, and the load is winched up the ramps and onto the deck. The toeplate 17, or platform 40, is then mounted to the deck to prevent the load from sliding rearwardly. The deck latch is then opened, and further winching causes the deck and load to slide forward to the desired balanced position.

Operation of the carrier of the invention may be readily understood by reference to FIGS. 1–5 wherein L denotes a load to be carried by the carrier across a level floor F and up a flight of stairs S. With reference to FIG. 1, the carrier 10 of the invention is moved into an upright position with the toeplate 17 resting substantially on the ground, and the carrier is pushed up against the sides of a load (such as a filing cabinet) with the toeplate 17 slipping under the near edge of the load. A belt B may be wrapped about the filing cabinet as depicted, with the ends of the belt attached to the deck of the carrier by means of small, downwardly and inwardly protruding fingers 17.5 (FIGS. 9 and 10) which are attached to the deck framework. The carrier is then tilted forwardly into the position shown in FIG. 2, the deck being permitted to slide rearwardly upon the frame so that the toeplate 17 of the deck remains in contact with the floor. At this point, the weight of the load is supported primarily by the toeplate 17 and the rearward portion of the track 14, with some of the weight of the load and carrier being born by the casters 24 at the front of the lifting arm 18. The center of gravity of the load and carrier, however, is to the rear of the midline of the frame of the carrier.

The deck is then advanced forwardly and upwardly on the carrier frame by cranking of the handle 22.2 (FIG. 9) until the load assumes the position shown in FIG. 3 in which the center of gravity of the load and carrier falls well between the rear of the track 14 and the casters 24. In this balanced condition, the load may be readily transported across the floor F by movement of the tracks. The bogie wheels referred to above may be employed to render the carrier freewheeling, and the carrier may be readily moved along the floor with minimum manual force.

When an upwardly sloping flight of stairs is encountered, the carrier is advanced to the foot of the stairs with the casters 24 approaching the bottom step. The lifting arm 18 is then controllably retracted into the frame of the carrier, which results in the leading end of the track being brought downward into contact with the treads of the stairs above the first step or two. The lifting arm is then further retracted completely within the frame, as shown in FIG. 4, and the carrier and load are advanced up the stairs by operation of the tracks. In this position, the center of gravity of the load and carrier are maintained between the ends of the track so that there is no tendancy of the load to tip forwardly or rearwardly. Movement of the deck forwardly or rearwardly of the carrier frame to maintain this balance may be easily accomplished by cranking the crank handle 22.2, as discussed above.

When the carrier has reached the top of the stairs, as shown in FIG. 5, the carrier is permitted to tip gently down into contact with the top floor FF, the center of gravity of the load and carrier being maintained between the forward and rearward ends of the track. The carrier and load may then traverse the floor FF with the carrier track resting fully on the floor, or the lifting arm may be energized by operation of the switch box 32.2 so as to cause the lifting arm to extend downwardly from the carrier frame, as shown in FIG. 6, so that the load is again supported at an angle to the floor. The load may be moved down stairways by simply reversing the above procedure, the toeplate 17 in each instance remaining at the lower end of the load.

When the load is supported in the position shown in FIG. 3, it will be understood that the load and carrier may be pivoted about the rear of the track with ease, and separate handtrucks or other equipment ordinarily are not required. The length of the lifting arm 18 is such that when the load is in the tilted position shown in FIG. 3 (the frame making an angle with the floor of about 30°–40°), the caster 24 is approximately beneath the leading end of the track so as to offer well-balanced support to the load L. In other words, provided the center of gravity of the load L and carrier is maintained between the lower end of the track and the casters 24, no forward or rearward tipping of the load can occur, and the load may be lowered to a substantially horizontal position or raised to the tilted position of FIG. 3 safely and easily.

When a heavily loaded carrier of the invention, with its tracks fully on the floor FF, is to be moved into the tilted position shown in FIG. 3, considerable force is required to cause the lifting arm 18 to extend from the frame of the carrier. It will be understood from FIGS. 7 and 8 that when the thrusters 20.1 are extended (by operation of their individual electric motors), the cam 26 is caused to pivot clockwise about its connection to the lifting arm and the rounded cam edge 26.2 bears against the cam follower rollers 26.4 to increase the distance between the pivotal mounting of the cam and its contact with the rollers 26.4. When the cam has reached the position shown in FIG. 7, further pivotal movement of the cam may be restrained by means of stops or the like, and the thrusters 20.1 form a sufficiently large angle with the lifting arm 18 so that further extension of the thrusters swings the lifting arm further from the frame and into the position shown in FIG. 3. Similarly, when the carrier, loaded and in the position shown in FIG. 3, is to be lowered into flush engagement of its tracks with the floor, the thrusters are retracted and the cam follower rollers 26.4 descend into contact with the cam edges 26.2, as shown in FIG. 7. In this position, the cam aids in bearing the weight of the carrier frame. As the thrusters 20.1 are further retracted, the cam rotates counterclockwise into the position shown in FIG. 8 in which the lifting arm is fully retracted within the frame. In this manner, the cam and cam follower provide an additional source of lifting power when the thrusters approach a position parallel to the lifting arms.

Referring again to FIG. 7, it will be understood that the rearwardly extending bogie wheels 36 (supported by tubing sections 34) may be attached to the carrier when the latter is in a horizontal position as in FIG. 8. As the carrier is thereafter lifted upwardly to e.g., the position of FIG. 7, the rear bogie wheels encounter the ground and the rearward end of the track is accordingly lifted from ground contact, rendering the carrier freewheeling. Similarly, the forward bogie wheels 36 (supported by tubing sections 13.4a) may be attached to the carrier only when the carrier is tilted at a significant angle to the ground, as in FIG. 3. Subsequent lowering of the carrier brings the forward bogie wheels into contact with the ground, and the track is lifted from ground contact as before to render the carrier freewheeling. With either location of the bogie wheels, the carrier may be so tilted as to bring both the bogie wheels and the rearward end of the track into engagement with the ground.

While we have described a preferred embodiment of the present invention, it should be understood that various changes, adaptations, and modifications may be made therein without departing from the spirit of the invention and the scope of the appended claims.

What is claimed is:

1. A tracked carrier for carrying loads in a tilted position across floors and up and down stairs, and comprising
    an elongate load-carrying frame with means to which a load may be attached along the elongate frame, the frame having upper and lower ends,
    a spaced pair of elongate, parallel, endless tracks extending along opposite sides of the frame and being movable in elongated paths to drive the frame along a supporting surface and up and down stairs, the tracks extending beyond the lower end of the frame to support the frame upon such a supporting surface when the frame is tipped to upright and inclined positions;
    a lifting arm pivotally mounted at one end to the frame adjacent the lower end thereof, and having a floor-engaging caster at its other end, the lifting arm being configured for reception within the frame between the tracks when swung upwardly into a retracted position with the caster nearer the upper than the lower end of the tracks, and the arm being swingable to near horizontal position when the elongate frame is supported in upright position on the lower ends of the elongate endless tracks and against a load to be tipped into inclined transport position; and
    means for controllably swinging the lifting arm outwardly from its retracted position to support the frame in an inclined angle with the floor for travel therealong on the caster wheel and the lower ends of the elongate endless tracks.

2. The carrier of claim 1 wherein said means for swinging the lifting arm comprises an axially extensible thruster extending between the lifting arm and the frame of the carrier.

3. A tracked carrier for carrying loads in a tilted position across floors and up and down stairs, and comprising
    a frame carrying at its sides a spaced pair of parallel, endless tracks movable in elongated paths to drive the frame along a surface and up and down stairs;
    a lifting arm pivotally mounted at one end to the frame adjacent the rear of the frame and having a floor-engaging caster at its other end, the lifting arm being configured for reception within the frame between the tracks when swung upwardly into a retracted position with the caster nearer the forward than the rearward end of the tracks; and
    means for controllably swinging the lifting arm outwardly from its retracted position to tilt the frame into an acute, stair-engaging angle with the floor with the center of gravity of the carrier spaced rearwardly of the caster, whereby the tilted carrier and any load carried thereby are balanced and supported rearwardly by the rearward ends of the tracks and forwardly by the caster for movement along a floor, said means for swinging the lifting arm comprises a pair of thrusters lying in a common plane and a bracket pivotally connected to the forward ends of the thrusters and pivotally connected to the forward end of the frame to permit pivoting of the bracket about an axis normal to the plane of the thrusters for accommodation of unequal rates of extension or retraction of the thrusters, and a thruster-actuated cam pivotally mounted to the lifting arm for rotation in response to extension or retraction of the thrusters, and a cam follower mounted to the frame, the cam being configured to force the cam follower upwardly in response to extension of the thrusters to swing the lifting arm outwardly from the frame.

4. A tracked carrier for carrying loads in a tilted position across floors and up and down stairs, and comprising
    a frame carrying at its sides a spaced pair of parallel, endless tracks movable in parallel, elongated paths to drive the frame along a surface or up and down stairs;
    a lifting arm swingably mounted at one end to the frame and having a floor-engaging caster at its other end, the lifting arm being configured for reception within the frame between the tracks when swung upwardly into a retracted position; and
    means for controllably swinging the lifting arm outwardly from its retracted position to tilt the frame into an acute, stair-engaging angle with the floor and comprising a cam with an arcuate camming surface pivotally mounted to the lifting arm along its length, a cam follower mounted to the frame in cam-engaging position, and at least one axially extensible thruster mounted at one end to the frame and at its other end to the cam to rotate the latter, the camming surface being configured to force the cam follower upwardly in response to rotation of the cam by extension of the thruster, thereby initiating outward movement of the lifting arm from the frame.

5. The carrier of claim 4 including a spaced pair of axially extensible thrusters lying in a common plane, and including a bracket pivotally and individually mounting the thrusters at their forward ends to the forward end of the frame and pivotal about an axis normal to the plane of the thrusters to accommodate unequal rates of thruster extension.

6. The carrier of claim 5 including a separate power source for each thruster to extend and retract the same, each source of power being mounted to the respective thruster and movable with the thruster as the latter is extended and retracted.

7. The carrier of claim 6 including a bracket holder pivotally mounting the thruster bracket to the forward end of the frame for pivotal movement about a transverse axis and permitting the thrusters to change angles with respect to the floor as they are extended and retracted.

8. An easily loaded and unloaded tracked carrier for carrying loads in a tilted position across floors and up and down stairs and comprising
 a frame carrying at its sides a spaced pair of parallel, endless tracks movable in elongated paths to drive the frame along a floor and up and down stairs;
 a lifting arm having a caster at one end and mounted at its other end to the frame, the lifting arm being movable outwardly from the frame to tilt the frame forwardly and upwardly into an acute angle with the floor with the center of gravity of the frame falling rearwardly of the caster;
 an upper deck for bearing a load and slideably carried by the frame for movement rearwardly thereof to permit the rearward end of the deck to project rearwardly of the rearward end of the tracks; and
 load-adjustment means for moving the deck forwardly or rearwardly of the frame to adjust the center of gravity of the carrier and its load over the tracks and permitting the rearward end of the deck to rest on the floor to the rear of the tracks when the frame has been lifted to form said acute angle with respect to the floor, to thereby facilitate loading and unloading the carrier.

9. The carrier of claim 8 wherein the deck, at its rearward end, includes an outwardly projecting toe-plate for engaging loads and preventing movement of the loads rearwardly of the deck.

10. The carrier of claim 8 wherein the load adjustment means includes a frame-mounted winch and a winch cable extending from the winch and attached to the deck, and wherein the frame and deck have coacting guides and guide followers for guiding the deck forwardly and rearwardly of the frame in response to operation of the winch.

11. An easily loaded and unloaded, tracked, stair-climbing, adjustable-balance carrier for carrying loads up and down stairs and across floors, and comprising
 a generally flat, elongated frame having sprockets at its front and rear, and a pair of spaced, endless, parallel lugged tracks trained over the sprockets for movement of the frame forwardly or rearwardly;
 a lifting arm comprising a pair of spaced, generally parallel and coextensive lever arms each mounted at one end to the frame adjacent the rear of the frame and having a floor-engaging caster at its other end, the lever arms being configured for reception within the frame between the tracks when swung upwardly into a retracted position with the casters nearer the forward than the rearward end of the tracks;
 means for swinging the lifting arm outwardly from its retracted position to tilt the frame into an acute, stair-engaging angle of about 30° – 40° with the floor with the center of gravity of the carrier spaced rearwardly of the casters, and including an elongated, extensible and retractable thruster pivotally mounted at opposite ends to the frame and arm to rotate the latter, and a bracket pivotally mounted to the forward end of the frame and having a pivot separately mounting the forward end of the thruster thereto;
 an upper deck slidably mounted on the frame for carrying a load and slidable along the frame forwardly thereof and also rearwardly thereof to the extent that the rearward end of the deck projects beyond the rearward end of the tracks to the floor when the frame is in its tilted position; and
 a drive mechanism connecting the deck and frame to move the deck and any load borne by the deck forwardly and rearwardly of the frame;
 whereby the carrier in a tilted position, and any load carried thereby, may be balanced and supported rearwardly by the rearward ends of the tracks and forwardly by the casters for movement along a floor and whereby the load may be adjusted so that the center of gravity of the load and carrier falls safely over the tracks for climbing of stairs.

12. The carrier of claim 8 including a platform releasably mounted to the rearward ends of the deck and extending outwardly from the deck, the platform having at least one rearwardly extending caster at its outer end in position to engage the floor when the deck is in a raised, upright position, whereby the carrier and any load thereon is supported forwardly by the rearward end of the tracks and rearwardly by at least one platform caster.

13. The carrier of claim 8 including bogie wheels releasably mounted to the frame adjacent the rearward ends of the tracks and oriented to engage and disengage the floor as the carrier is tilted to varying predetermined angles with the floor.

14. A tracked carrier for carrying loads in a tilted position across floors and up and down stairs, and comprising:
 an elongate load-carrying frame with means to which a load may be attached along the elongate frame, the frame having upper and lower ends,
 a pair of elongate, parallel and endless tracks extending along opposite sides of the frame and being movable in elongated paths to drive the frame along a supporting surface and up and down stairs, the tracks extending beyond the lower end of the frame to support the frame upon such a supporting surface when the frame is tipped to upright and inclined positions;

a lifting arm having an inner end pivotally mounted on the frame adjacent the lower end thereof and having an outer end with a floor-engaging caster thereon, the lifting arm being configured for reception within the frame between the tracks when swung into retracted position;

a source of rotary power on the frame and including drive mechanism connected to said endless tracks and applying driving impetus to both of the tracks, said drive machanism including differential gearing through which such power is applied to the separate tracks, and means for controllably swinging the lifting arm outwardly from its retracted position to support the frame in an inclined angle with the floor for travel therealong on the caster wheel and the lower ends of the elongate endless tracks, the differential gearing and caster wheel facilitating steering during travel along the floor, and the differential gearing permitting steering during travel on a stairway with the caster wheel retracted.

15. The tracked carrier according to claim 14 and including a load-carrying platform having a lower end adjacent the lower end of the frame, the platform being slidably mounted on the frame and movable to extend the lower end of the platform downwardly beyond the lower end of the frame and beyond the adjacent end of the endless track, and the platform also being slidable upwardly along the frame to a position wherein the lower end of the platform is disposed between the ends of the frame and between the ends of the endless tracks thereon.

* * * * *